US011472091B2

(12) United States Patent
Usami et al.

(10) Patent No.: US 11,472,091 B2
(45) Date of Patent: Oct. 18, 2022

(54) TWO STEP BLOW MOLDING UNIT, APPARATUS AND METHOD

(71) Applicant: NISSEI ASB MACHINE CO., LTD., Nagano (JP)

(72) Inventors: Masayuki Usami, Nagano-ken (JP); Toshiteru Oike, Nagano-ken (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 299 days.

(21) Appl. No.: 15/771,887

(22) PCT Filed: Oct. 27, 2016

(86) PCT No.: PCT/JP2016/081924
§ 371 (c)(1),
(2) Date: Apr. 27, 2018

(87) PCT Pub. No.: WO2017/073685
PCT Pub. Date: May 4, 2017

(65) Prior Publication Data
US 2019/0061222 A1 Feb. 28, 2019

(30) Foreign Application Priority Data
Oct. 29, 2015 (JP) .............................. JP2015-213192

(51) Int. Cl.
B29C 49/18 (2006.01)
B29C 49/06 (2006.01)
(Continued)

(52) U.S. Cl.
CPC .............. *B29C 49/18* (2013.01); *B29C 49/06* (2013.01); *B29C 49/48* (2013.01);
(Continued)

(58) Field of Classification Search
CPC ....... B29C 49/18; B29C 33/307; B29C 49/16; B29C 49/185; B29C 2049/4869
See application file for complete search history.

(56) References Cited

U.S. PATENT DOCUMENTS 4,839,127 A    6/1989  Ajmera et al.
4,853,171 A *  8/1989  Ajmera ................... B29C 49/18
                                                        264/530
(Continued)

FOREIGN PATENT DOCUMENTS

JP    62-30018 A    2/1987
JP    6-47269      6/1994
(Continued)

OTHER PUBLICATIONS

The Extended European Search Report issued in counterpart European Application No. 16859914.0, dated Jul. 4, 2019.
(Continued)

*Primary Examiner* — Niki Bakhtiari
*Assistant Examiner* — Nicholas J Chidiac
(74) *Attorney, Agent, or Firm* — Greenblum & Bernstein, P.L.C.

(57) ABSTRACT

One purpose of the present invention is to provide a mold unit which is capable of achieving improvements in both energy efficiency and heat resistance performance; a blow molding apparatus; and a blow molding method. The present invention is provided with: a first mold part for performing a first step in which a preform is subjected to heat-set blowing at a first temperature; and a second metal mold part for performing a second step in which an intermediate molded body blow molded as a result of the heat-set blowing is blow molded at a second temperature lower than the first temperature, to produce a container. The first mold part and the second mold part are disposed adjacently to each other.

16 Claims, 12 Drawing Sheets

(51) Int. Cl.
  *B29C 49/02* (2006.01)
  *B29L 31/00* (2006.01)
  *B29K 67/00* (2006.01)
  *B29C 49/48* (2006.01)

(52) U.S. Cl.
  CPC .. *B29C 2049/023* (2013.01); *B29K 2067/003* (2013.01); *B29L 2031/7158* (2013.01)

(56) References Cited

U.S. PATENT DOCUMENTS

| | | | |
|---|---|---|---|
| 5,085,822 A | 2/1992 | Uehara et al. | |
| 5,182,122 A | 1/1993 | Uehara et al. | |
| 6,126,886 A | 10/2000 | Beck et al. | |
| 8,608,466 B2* | 12/2013 | Yokobayashi | B29C 33/305 |
| | | | 425/540 |
| 8,673,204 B2* | 3/2014 | Aoki | B29C 49/18 |
| | | | 264/519 |
| 8,944,806 B2* | 2/2015 | Yokobayashi | B29C 49/70 |
| | | | 425/525 |
| 8,998,602 B2* | 4/2015 | Yokobayashi | B29C 33/30 |
| | | | 425/540 |
| 9,393,731 B2* | 7/2016 | Yokobayashi | B29C 49/48 |
| 9,475,243 B2* | 10/2016 | Aoki | B29C 49/6481 |
| 2012/0132608 A1* | 5/2012 | Aoki | B29C 49/6481 |
| | | | 215/40 |
| 2012/0294974 A1* | 11/2012 | Yokobayashi | B29C 49/18 |
| | | | 425/541 |
| 2013/0241118 A1 | 9/2013 | Sato et al. | |
| 2014/0099396 A1* | 4/2014 | Yokobayashi | B29C 49/18 |
| | | | 425/522 |
| 2014/0190924 A1* | 7/2014 | Aoki | B29C 49/18 |
| | | | 215/40 |
| 2014/0203481 A1* | 7/2014 | Derrien | B29C 49/18 |
| | | | 264/532 |
| 2014/0255533 A1* | 9/2014 | Yokobayashi | B29C 49/30 |
| | | | 425/537 |
| 2014/0291877 A1* | 10/2014 | Takahashi | B29C 49/48 |
| | | | 264/39 |
| 2015/0021343 A1 | 1/2015 | Usami et al. | |
| 2015/0140159 A1* | 5/2015 | Yokobayashi | B29C 49/48 |
| | | | 425/541 |

FOREIGN PATENT DOCUMENTS

| | | |
|---|---|---|
| JP | 2010-036357 A | 2/2010 |
| JP | 2010-247371 A | 11/2010 |
| JP | 5503748 | 3/2014 |
| TW | 201347955 A | 2/2013 |

OTHER PUBLICATIONS

International Search Report issued in corresponding International Application No. PCT/JP2016/081924, dated Jan. 24, 2017.
Office Action issued in corresponding Taiwan Patent Application No. 105135060, dated Aug. 11, 2017.
Office Action issued in Chinese Patent Application No. 2020092202404640, dated Sep. 25, 2020 and English Translation thereof.
Office Action issued in Chinese Patent Application No. 201680063595.2, dated Sep. 25, 2020 and English Translation thereof.

* cited by examiner

FIG. 3
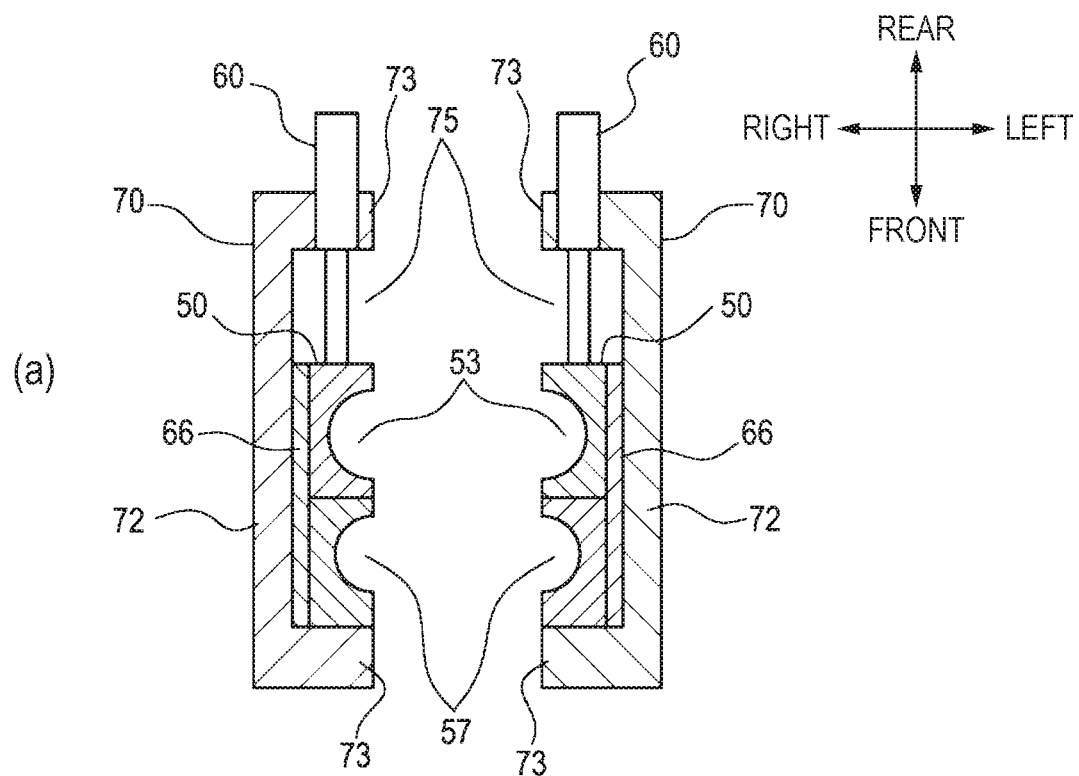
(a)
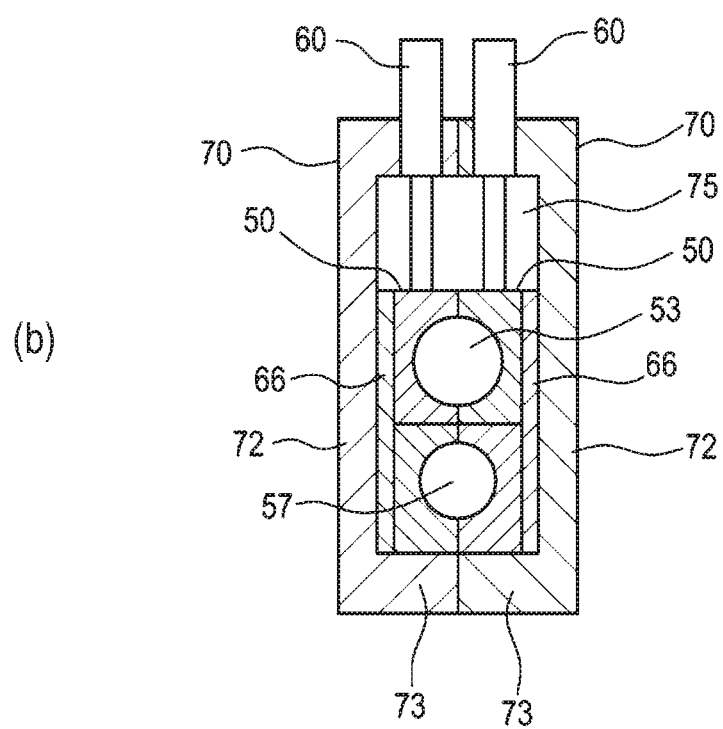
(b)

FIG. 10
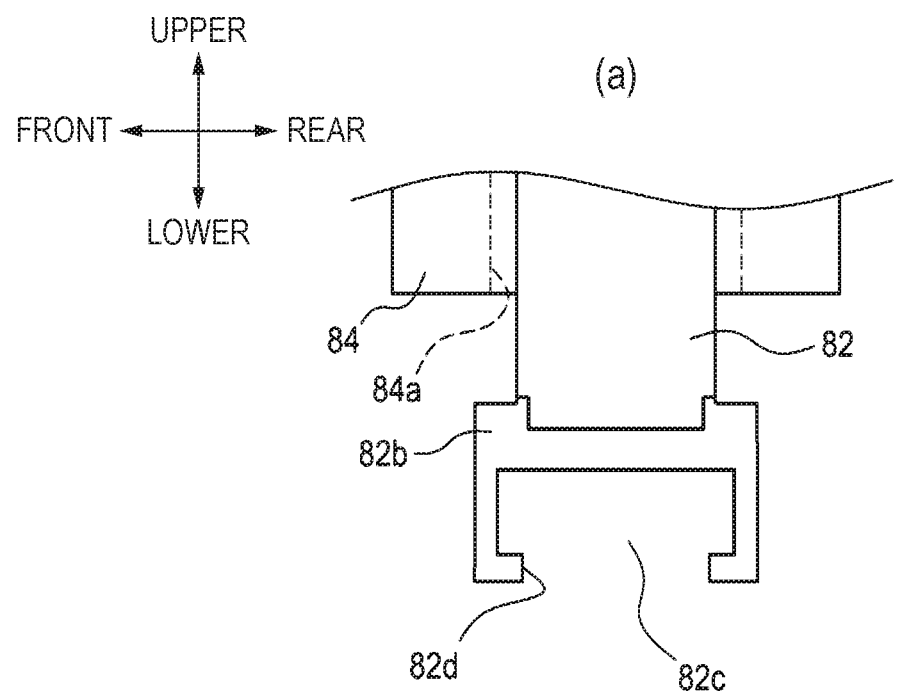
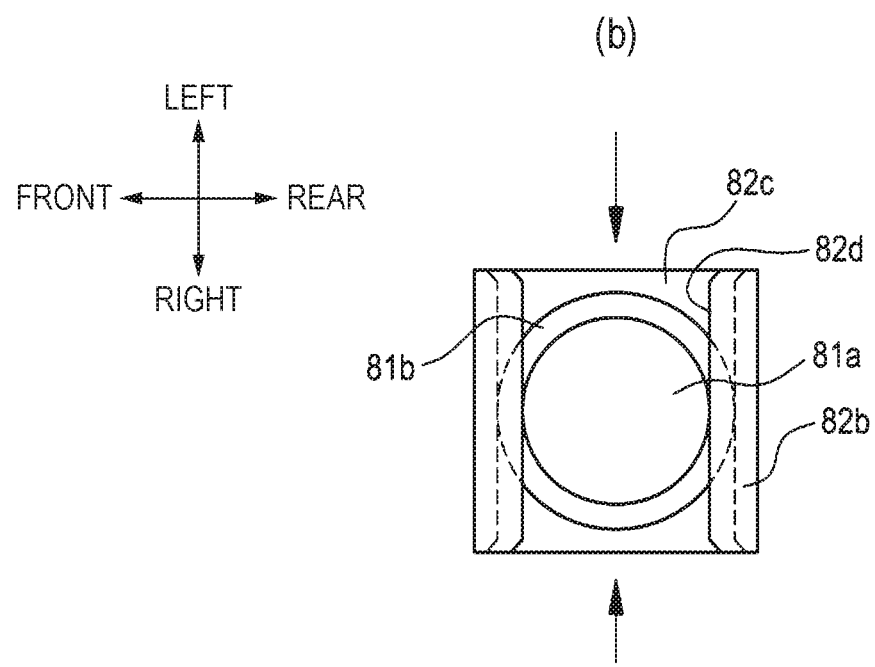

TWO STEP BLOW MOLDING UNIT, APPARATUS AND METHOD

This application is a national phase of International Application No. PCT/JP2016/081924, titled "Metal, Mold Unit, Blow Molding Apparatus, And Blow Molding Method", filed on Oct. 27, 2016, which claims the benefit of priority to Japanese Patent Application No. 2015-213192, filed in the Japan Patent Office on Oct. 29, 2015, the entire content of which are incorporated herein by reference.

TECHNICAL FIELD

The present invention relates to a mold unit of a resin container, a blow molding apparatus, and a blow molding method.

BACKGROUND ART

A blow molding apparatus is largely classified into a cold parison method (also referred to as 2-stage method) and a hot parison method (also referred to as 1-stage method).

Currently, when manufacturing a PET bottle having high heat resistance, an apparatus in which the 2-stage method is adopted has been used in many cases (refer to Patent Reference 1). In the apparatus of the 2-stage method, an injection molding apparatus for manufacturing a preform and a blow molding apparatus are connected in an offline state. For this reason, after a preform manufactured in the injection molding apparatus is once naturally cooled to a room temperature and stored at a predetermined place, the preform is supplied to the blow molding apparatus.

Also, regarding an apparatus in which the 1-stage method is adopted, a method of providing a PET bottle with heat resistance has been suggested (refer to Patent Reference 2).

PRIOR ART LITERATURE

Patent Literature

Patent Reference 1: Japanese Patent No. 5503748
Patent Reference 2: JP-A-H06-47269

SUMMARY OF THE INVENTION

Problem that the Invention is to Solve

With the apparatus of the 2-stage method, it is possible to manufacture the PET bottle having high heat resistance. However, since it is necessary to heat the preform to a temperature suitable for a blowing in a heating part after the preform is once naturally cooled, the energy efficiency is low.

On the other hand, with the apparatus of the 1-stage method, since the preform is not cooled to the room temperature, the energy efficiency is higher than the 2-stage method. However, it is not possible to obtain the PET bottle having the sufficient heat resistance, as compared to the 2-stage method.

It is therefore an object of the present invention to provide a mold unit, a blow molding apparatus, and a blow molding method capable of achieving improvements on both energy efficiency and heat resistance performance.

Means for Solving the Problems

In order to achieve the object, a mold unit of the present invention includes:

a first mold part for performing a first step of subjecting a preform to heat-set blowing at a first temperature, and a second mold part for performing a second step of blow molding an intermediate molded article, which has been blow-molded by the heat-set blowing, at a second temperature lower than the first temperature, thereby manufacturing a container, wherein the first mold part and the second mold part are disposed adjacently to each other.

According to the above configuration, since the first mold part and the second mold part are separately configured, it is possible to perform the first step of performing the heat-set blowing, independently of the second step to be then executed in succession. For this reason, it is possible to set the first temperature, which is to be used in the heat-set blowing of the first step, to a temperature higher than the second temperature, which is to be used in the second step, for example, to a temperature at which crystallization of resin is promoted. Therefore, it is possible to obtain the container having sufficient heat resistance. Also, since the first mold part and the second mold part are disposed adjacently to each other, it is possible to perform the first step and the second step in succession and it is not necessary to perform processing such as a temperature adjustment for the intermediate molded article, so that it is possible to improve the energy efficiency.

Like this, according to the above configuration, it is possible to provide the mold unit capable of achieving improvements on both the energy efficiency and the heat resistance performance.

Also, the mold unit of the present invention preferably includes an accommodation unit having a movement space in which the first mold part and the second mold part can integrally slide and accommodating the first mold part and the second mold part in the movement space during the first step and the second step.

According to the above configuration, it is possible to smoothly separately perform in succession the first step of subjecting the preform to the heat-set blowing at the first temperature and the second step of blow molding the intermediate molded article at the second temperature to manufacture the container, and to protect the first mold part and the second mold part from an outside by the accommodation unit. Also, since the first mold part and the second mold part, which are independent of each other, are integrated in the accommodation unit, it is possible to convey the mold parts at the same time and to easily perform a detaching/attaching operation upon replacement of the mold unit.

Also, in the mold unit of the present invention, preferably, the first mold part has a first inner wall surface that defines a first space in which the preform is to be disposed, and the second mold part has a second inner wall surface that defines a second space in which the intermediate molded article is to be disposed.

According to the above configuration, it is possible to smoothly separately perform in succession the first step of subjecting the preform to the heat-set blowing at the first temperature and the second step of blow molding the intermediate molded article at the second temperature to manufacture the container.

Also, in the mold unit of the present invention, preferably, the first space is greater than the second space.

According to the above configuration, during the heat-set blowing, it is possible to largely blow-mold the preform, considering shrinkage after the heat-set blowing. Accordingly, it is possible to reduce residual stress (strain caused due to stretching orientation) remaining in the final formed article (container).

Also, in the mold unit of the present invention, a bottom mold is capable of moving up and down in a vertical direction perpendicular to a direction in which the first mold part and the second mold part slide.

Also, a blow molding apparatus of the present invention includes:

an injection molding unit manufacturing a bottomed preform made of resin, and a continuous blow molding unit including:

a first mold part for performing a first step of subjecting a preform manufactured by the injection molding unit to heat-set blowing at a first temperature, and a second mold part for performing a second step of blow molding an intermediate molded article, which has been blow-molded by the heat-set blowing, at a second temperature lower than the first temperature, thereby manufacturing a container, wherein the first mold part and the second mold part are disposed adjacently to each other in the continuous blow molding unit.

According to the above configuration, since the preform manufactured by the injection molding unit is subjected to the heat-set blowing without being cooled to a room temperature, the energy for reheating the preform to a temperature suitable for blowing is not required. For this reason, it is possible to improve the energy efficiency. Also, since the first mold part and the second mold part are separately formed, it is possible to perform the first step of performing the heat-set blowing, independently of the second step to be then performed in succession. For this reason, it is possible to set the first temperature, which is to be used in the heat-set blowing of the first step, to a temperature higher than the second temperature, which is to be used in the second step, for example, to a temperature at which crystallization of resin is promoted, so that it is possible to obtain the container having sufficient heat resistance. Also, since the first mold part and the second mold part are disposed adjacently to each other, it is possible to perform the first step and the second step in succession and it is not necessary to perform processing such as a temperature adjustment for the intermediate molded article in order to avoid lowering a temperature of the intermediate molded article, so that it is possible to improve the energy efficiency.

Like this, according to the above configuration, it is possible to provide the blow molding apparatus capable of achieving improvements on both the energy efficiency and the heat resistance performance.

Also, preferably, the blow molding apparatus of the present invention includes a temperature adjustment unit that performs a temperature adjustment processing for making a temperature distribution of the preform manufactured by the injection molding unit become close to a uniform temperature distribution, wherein the continuous blow molding unit performs the heat-set blowing for the preform that has been subjected to the temperature adjustment processing by the temperature adjustment unit.

In the preform immediately after being manufactured by the injection molding unit, there may be a deviation in the temperature distribution on the preform due to an influence of heat upon the injection.

According to the above configuration, since the temperature adjustment processing is performed for the injection-molded preform and the heat-set blowing is performed for the preform after the temperature adjustment processing, it is possible to reduce a temperature deviation, which may be caused on the intermediate molded article or the final container, so that the non-uniform thickness is difficult to be caused. Thereby, it is possible to obtain the more stable heat resistance.

Also, in the blow molding apparatus of the present invention, preferably, the continuous blow molding unit includes:

a support part supporting the preform during the first step and supporting the intermediate molded article during the second step, a mold unit having:

a first space in which the preform supported by the support part during the first step is to be disposed and which is configured by a first inner wall surface to be used in the heat-set blowing of the first step, and a second space in which the intermediate molded article supported by the support part during the second step is to be disposed and which is configured by a second inner wall surface to be used in the blow molding of the second step, and a moving unit capable of relatively moving the support part and the mold unit, wherein the first mold part has the first inner wall surface, and wherein the second mold part has the second inner wall surface.

According to the above configuration, it is possible to smoothly separately perform in succession the first step of subjecting the preform to the heat-set blowing at the first temperature and the second step of blow molding the intermediate molded article at the second temperature to manufacture the container.

Also, in the blow molding apparatus of the present invention, preferably, the first space is greater than the second space.

According to the above configuration, during the heat-set blowing, it is possible to blow-mold the preform largely, considering shrinkage after the heat-set blowing.

Also, in the blow molding apparatus of the present invention, preferably, a position at which the support part supports the preform during the first step and a position at which the support part supports the intermediate molded article during the second step are the same, and wherein the moving unit slides the mold unit so that the intermediate molded article is to be disposed in the second space after the first step.

According to the above configuration, it is possible to further smoothly separately perform in succession the first step of subjecting the preform to the heat-set blowing at the first temperature and the second step of blow molding the intermediate molded article at the second temperature to manufacture the container.

Also, the blow molding apparatus of the present invention preferably includes an accommodation unit having a movement space in which the mold unit is capable of being slid by the moving unit, and accommodating the mold unit in the movement space during the first step and the second step.

According to the above configuration, the mold unit is protected from an outside by the accommodation unit.

Also, in the blow molding apparatus of the present invention, preferably, the accommodation unit includes a positioning part for determining a position of the mold unit during the first step and the second step.

According to the above configuration, since a position of the mold unit is determined with accuracy, a defect due to a positional deviation in each step is difficult to be caused.

Also, the blow molding apparatus of the present invention may include an elevation device moving up and down a bottom mold in a vertical direction perpendicular to a direction in which the first mold part and the second mold part slide.

Also, a blow molding method of the present invention includes:

an injection molding step of injection molding a bottomed preform made of resin, and a continuous blowing step of separately continuously performing:

a first step of subjecting the preform manufactured in the injection molding step to heat-set blowing at a first temperature, and a second step of blow molding an intermediate molded article, which has been blow-molded by the heat-set blowing, at a second temperature lower than the first temperature, thereby manufacturing a container.

According to the above method, since a first mold part and a second mold part are separately formed, it is possible to perform the first step of performing the heat-set blowing, independently of the second step to be then performed in succession. For this reason, it is possible to set the first temperature, which is to be used in the heat-set blowing of the first step, to a temperature higher than the second temperature, which is to be used in the second step, for example, to a temperature at which crystallization of resin is promoted, so that it is possible to obtain the container having sufficient heat resistance. Also, since the first mold part and the second mold part are disposed adjacently to each other, it is possible to perform the first step and the second step in succession and it is not necessary to perform processing such as a temperature adjustment for the intermediate molded article in order to avoid lowering a temperature of the intermediate molded article, so that it is possible to improve the energy efficiency.

Like this, according to the above configuration, it is possible to provide the blow molding method capable of achieving improvements on both the energy efficiency and the heat resistance performance.

Also, preferably, the blow molding method of the present invention includes a temperature adjustment step of performing a temperature adjustment processing for making a temperature distribution of the preform manufactured in the injection molding step become close to a uniform temperature distribution after the injection molding step, wherein in the first step of the continuous blowing step, the heat-set blowing is performed for the preform that has been subjected to the temperature adjustment processing in the temperature adjustment step.

In the preform immediately after being manufactured by an injection molding unit, there may be a deviation in the temperature distribution on the preform due to an influence of heat upon the injection.

According to the above method, since the temperature adjustment processing is performed for the injection-molded preform and the heat-set blowing is performed for the preform after the temperature adjustment processing, it is possible to reduce a temperature deviation, which may be caused on the intermediate molded article or the final container, so that the non-uniform thickness is difficult to be caused. Thereby, it is possible to obtain the more stable heat resistance.

Effects of the Invention

According to the present invention, it is possible to provide the mold unit, the blow molding apparatus, and the blow molding method capable of achieving improvements on both the energy efficiency and the heat resistance performance.

BRIEF DESCRIPTION OF DRAWINGS

FIG. 3(a) is a sectional view taken along a line A-A of FIG. 2(b), and FIG. 3(b) is a sectional view taken along a line B-B of FIG. 2(c).

FIGS. 10(a) and 10(b) are enlarged views of coupled parts of a modified embodiment.

MODE FOR CARRYING OUT THE INVENTION

Hereinafter, an example of an illustrative embodiment will be described with reference to the drawings.

Figure 1:
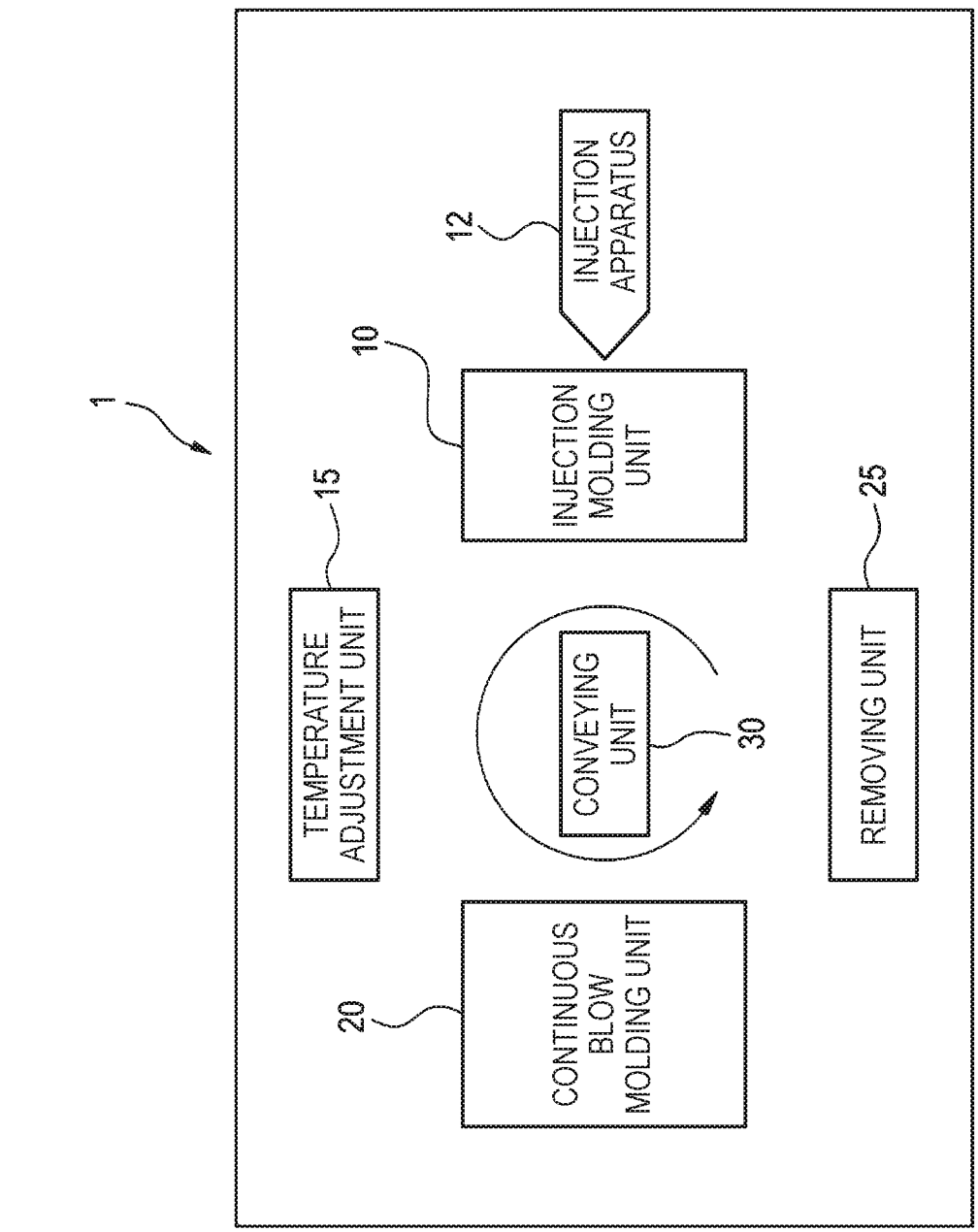
FIG. 1 is a block diagram of a blow molding apparatus of the present invention.
Figure 2:
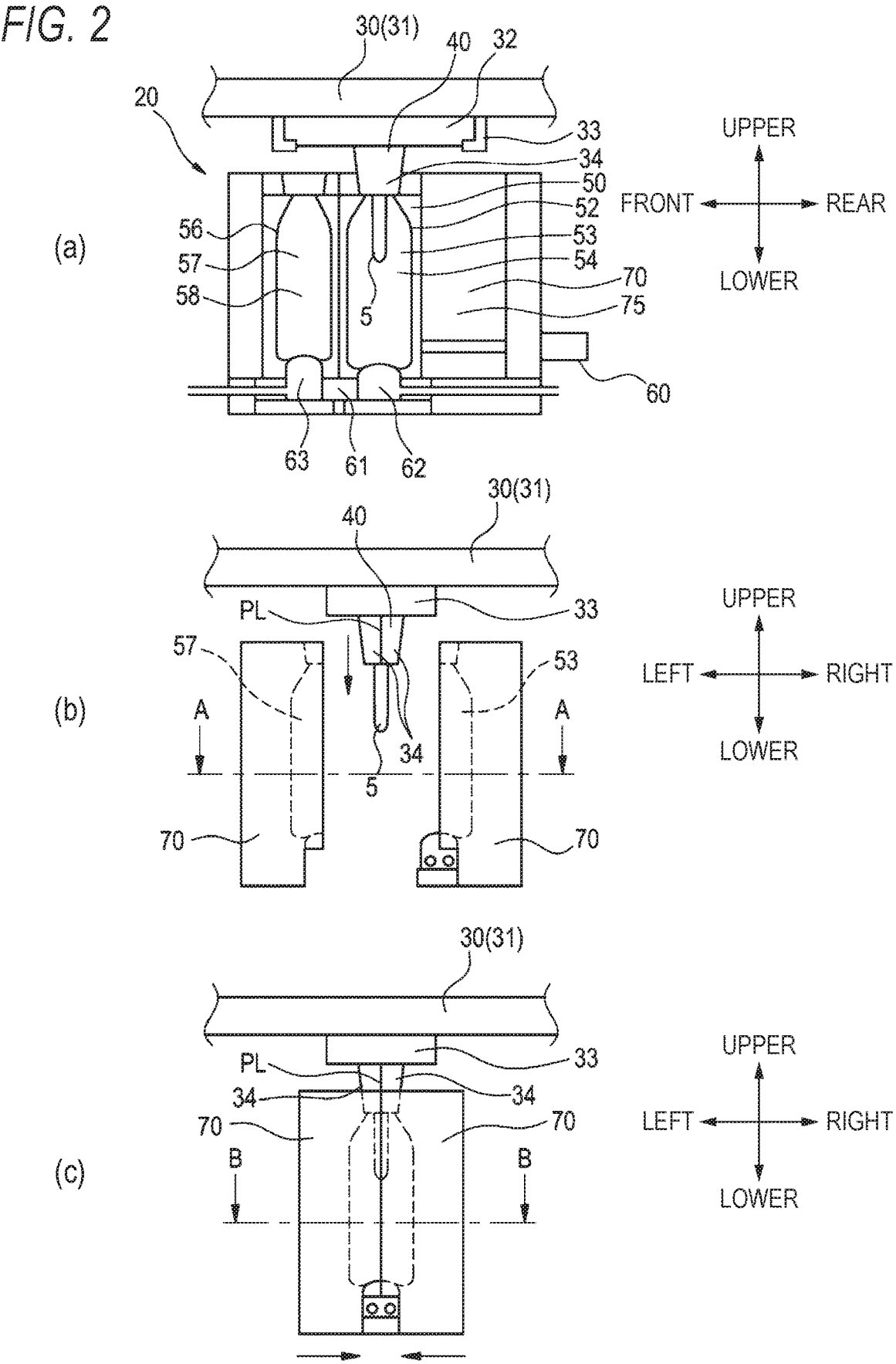
FIGS. 2(a) to 2(c) depict a configuration of a continuous blow molding unit in the blow molding apparatus.
Figure 4:
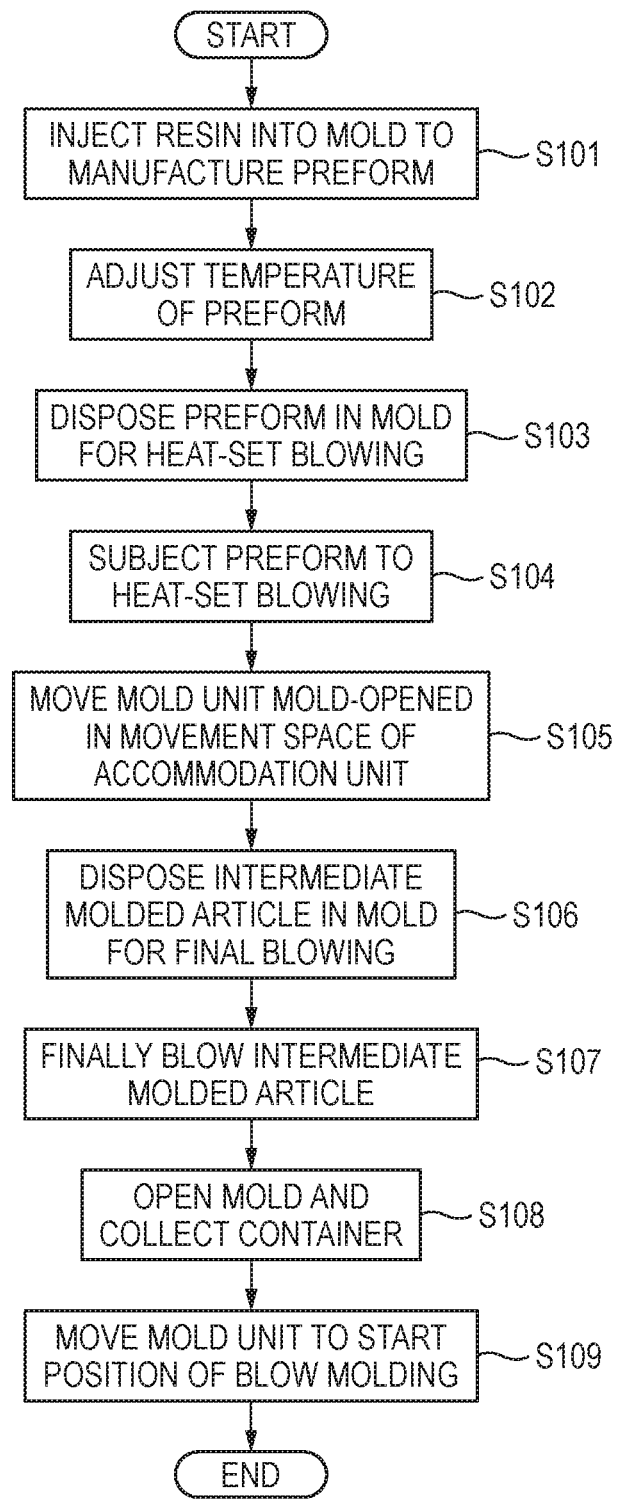
FIG. 4 is a flowchart depicting a blow molding method of the present invention.

First, a blow molding apparatus is described with reference to FIGS. 1 and 2.

A blow molding apparatus 1 includes an injection molding unit (injection molding part) 10 for manufacturing a preform, and a temperature adjustment unit (temperature adjustment part) 15 for adjusting a temperature of the manufactured preform. The injection molding unit 10 is connected with an injection apparatus 12 that supplies resin which is a source material of a container. Also, the blow molding apparatus 1 includes a continuous blow molding unit (blow molding part) 20 for blowing the preform to manufacture a container and a removing unit (removing part) 25 for removing the manufactured container. Therefore, the blow molding apparatus is configured as a 1-stage type blow molding apparatus as a whole.

The injection molding unit 10, the temperature adjustment unit 15, the continuous blow molding unit 20 and the removing unit 25 are provided at rotated positions by predetermined angles (90°, in this example) about a conveying means 30. The conveying means 30 is configured by a rotating plate 31 and the like. The rotating plate 31 is mounted with a neck mold fixing plate 32 and an L-shaped guide rail 33. The rotating plate 31 is mounted with a neck mold (neck separation mold) 34 via the neck mold fixing plate 32. A preform manufactured in the injection molding unit 10 or a container manufactured in the continuous blow molding unit 20 is supported at its mouth part by the neck mold 34, and is conveyed to each unit in association with rotation of the rotating plate 31.

The injection molding unit 10 includes an injection cavity mold, an injection core mold, a neck mold and the like, which are not shown. A resin material is caused to flow from the injection apparatus 12 into a preform-shaped space, which is formed as the molds are mold-clamped, so that a bottomed cylindrical preform is configured to be manufactured.

The temperature adjustment unit 15 is configured to perform a temperature adjustment so that a temperature of the preform manufactured in the injection molding unit 10 becomes a uniform temperature distribution over the entire preform. Also, the temperature adjustment unit 15 is configured to adjust the preform to a temperature (for example, about 90° C. to 100° C.) suitable for stretching blowing. For example, the preform is disposed in a temperature adjustment pot, and a blowing pressure is introduced from a temperature adjustment blow core mold fitted in a mouth part of the preform. By the introduced blowing pressure, the preform is preliminarily blown and is contacted to an inner surface of the temperature adjustment pot, so that the preform is adjusted to a temperature suitable for blowing. Also, the preform may be temperature-adjusted in a non-contact state by heat generated from the temperature adjustment (heating) blow core mold or temperature adjustment (heating) port without performing the preliminary blowing.

The continuous blow molding unit 20 is configured to perform heat-set blowing and final blowing (which will be described later) for the preform temperature-adjusted in the temperature adjustment unit 15, thereby manufacturing a container made of resin.

The removing unit 25 is configured to remove the container to an outside from the blow molding apparatus 1 by opening a neck part of the container manufactured in the continuous blow molding unit 20 from the neck mold 34.

Subsequently, the continuous blow molding unit 20 is described in detail with reference to FIGS. 2 and 3.

FIG. 2(a) depicts a state where a preform 5 is disposed in the continuous blow molding unit 20. Also, FIGS. 2(b) and 2(c) depict the continuous blow molding unit 20, as seen from a rear side, in which FIG. 2(b) depicts a mold unit in an opened state and FIG. 2(c) depicts the mold unit in a closed state. Also, FIG. 3(a) is a sectional view taken along a line A-A of FIG. 2(b), and FIG. 3(b) is a sectional view taken along a line B-B of FIG. 2(c).

The continuous blow molding unit 20 includes a support part 40 supporting the preform and the like, a mold unit 50 having split molds, a moving unit 60 moving the mold unit 50, and an accommodation unit 70 accommodating the mold unit 50. Also, the accommodation unit 70 is coupled to a mold clamping device (not shown) of the blow molding apparatus 1 to be openable and closable.

The support part 40 has the neck mold 34 including a pair of split molds. The neck mold 34 supports a neck part of the preform 5 and is held to a pair of neck mold fixing plates 32. The neck mold fixing plates 32 are supported by the L-shaped guide rail 33 fixed to a lower surface of the rotating plate 31 to be freely openable and closable. A blow core mold 35 (refer to FIG. 5) is supported to be freely moveable up and down above the rotating plate 31. The blow core mold 35 introduces blow air into the preform 5 with being fitted in the mouth part of the preform 5, thereby blow-molding the preform 5 into an intermediate molded article. Also, a stretching rod 36 (refer to FIG. 5) is installed above the rotating plate 31. The stretching rod 36 is configured to control a stroke of the stretching rod under control of a rod drive unit. In this way, for example, the support part 40 is configured to move up and down and takes the preform 5 or the intermediate molded article blow-molded in and out the mold unit 50. The blow core mold 35 and the stretching rod 36 are commonly used in a first mold part 52 and a second mold part 56, which will be described later.

The mold unit 50 includes a first mold part 52 for subjecting the preform 5 to heat-set blowing (primary blowing accompanied by heat setting) to blow-mold an intermediate molded article, and a second mold part 56 for subjecting the intermediate molded article to blowing (final blowing (secondary blowing accompanied by annealing and shaping processing into a final container shape)) to blow-mold a container. The first mold part 52 and the second mold part 56 are disposed adjacently to each other in the mold unit 50.

The first mold part 52 has a first space 53 configured by a first inner wall surface 54, and the preform 5 supported by the support part 40 is disposed in the first space 53. The second mold part 56 has a second space 57 configured by a second inner wall surface 58, and the intermediate molded article supported by the support part 40 is disposed in the second space 57. The first space 53 of the first mold part 52 is formed to be larger than the second space 57 of the second mold part 56. The first inner wall surface 54 of the first mold part 52 is configured as a wall surface having minor unevenness, and the second inner wall surface 58 of the second mold part 56 is configured as a wall surface having an unevenness for forming an outer peripheral wall of the container.

The mold unit 50 is provided with a heating device and a temperature adjustment device, which are not shown, and is configured to temperature-adjust the first mold part 52 and the second mold part 56. The first inner wall surface 54 of the first mold part 52 is temperature-adjusted to a first temperature (for example, 170° C. to 190° C.) for subjecting the preform 5 to the heat-set blowing. The second inner wall surface 58 of the second mold part 56 is temperature-adjusted to a second temperature (for example, 110° C. to 120° C.) for subjecting the intermediate molded article to the final blowing. The first temperature is set to a temperature higher than a temperature (for example, 130° C. to 140° C.) at which crystallization of a resin material (for example, polyethylene terephthalate) of the manufactured container is likely to be promoted, considering easiness of resin stretching and lowering in temperature due to contact with the inner wall surface of the mold. The second temperature is set to a temperature lower than the first temperature.

A back side (a left side and a right side in FIG. 3) of the mold unit 50 is provided with a moveable plate 66 arranged along a wall surface of the accommodation unit 70. The moveable plate 66 is attached with a pulley (not shown) or the like, for example, and is configured to smoothly move along the wall surface of the accommodation unit 70. The mold unit 50 is attached to a surface side of the moveable plate 66. A surface of the moveable plate 66 that corresponds to a lower side of the mold unit 50 is attached with a bottom mold 62 for the first mold part 52 and a bottom mold 63 for the second mold part 56. The bottom mold 62 is configured to move up and down relative to the first mold part 52, and the bottom mold 63 is configured to move up and down relative to the second mold part 56. As described later, when the mold unit 50 is in an opened state, since the bottom molds 62, 63 is slid integrally with the moveable plate 66, the bottom molds 62, 63 are not capable of being fixed in a normal state to an elevation device (not shown) of the blow molding apparatus 1 moving up and down the bottom molds 62, 63. Therefore, lower surfaces of the bottom molds 62, 63 (or a bottom mold fixing plate (not shown) having the bottom molds integrated) are provided with a mechanism that can be coupled to the elevation device only when the mold unit 50 is in a closed state. The elevation device will be described later.

The moving unit 60 is attached to a side surface (a rear side surface, in this example) of the mold unit 50, and is configured to move the mold unit 50 in a front and rear direction with respect to the continuous blow molding unit 20. The moving unit 60 is configured by a hydraulic cylinder or an air cylinder, for example and controls a position of the mold unit 50 by extending and contracting a cylinder rod having a leading end fixed to the mold unit 50. The mold unit 50 fixed to the moving unit 60 and the bottom molds 62, 63 move in the same direction as a movement of the cylinder rod under control of the moving unit 60. Thereby, it is possible to relatively move the support part 40 and the mold unit 50. Therefore, it is possible to implement the heat-set blow molding and the final blow molding for the preform held with the support part 40 in the continuous blow molding unit (blow molding part) 20.

The accommodation unit 70 is configured to surround the mold unit 50, and has a sidewall part 72 provided at a back side (a left side and a right side in FIG. 3) of the moveable plate 66 and positioning parts 73 provided at both ends of the sidewall part 72. The sidewall part 72 defines a moveable direction and a moveable area of the moveable plate 66 to which the mold unit 50 is attached. The positioning parts 73 define ends of movement of the mold unit 50 attached to the moveable plate 66, thereby determining a position of the mold unit 50 during the heat-set blowing and during the final blowing. The accommodation unit 70 has a space 75 formed by the sidewall part 72 and the positioning parts 73. The space 75 configures a movement space in which the mold unit 50 is slidable.

Next, a blow molding method is described with reference to FIGS. 4 to 7. In FIGS. 5 to 8, the configuration of the moving unit (cylinder rod) is omitted for simplifying the drawings.

First, in the injection molding unit 10, the preform 5 is manufactured by injecting resin from the injection apparatus 12 into a space formed by the mold clamping (step S101).

Subsequently, the preform 5 is conveyed to the temperature adjustment unit 15 by the conveying means 30. In the temperature adjustment unit 15, temperature adjustment is performed so as to make the entire preform 5 become close to a uniform temperature distribution and a temperature suitable for stretching blowing (step S102).

Figure 5:
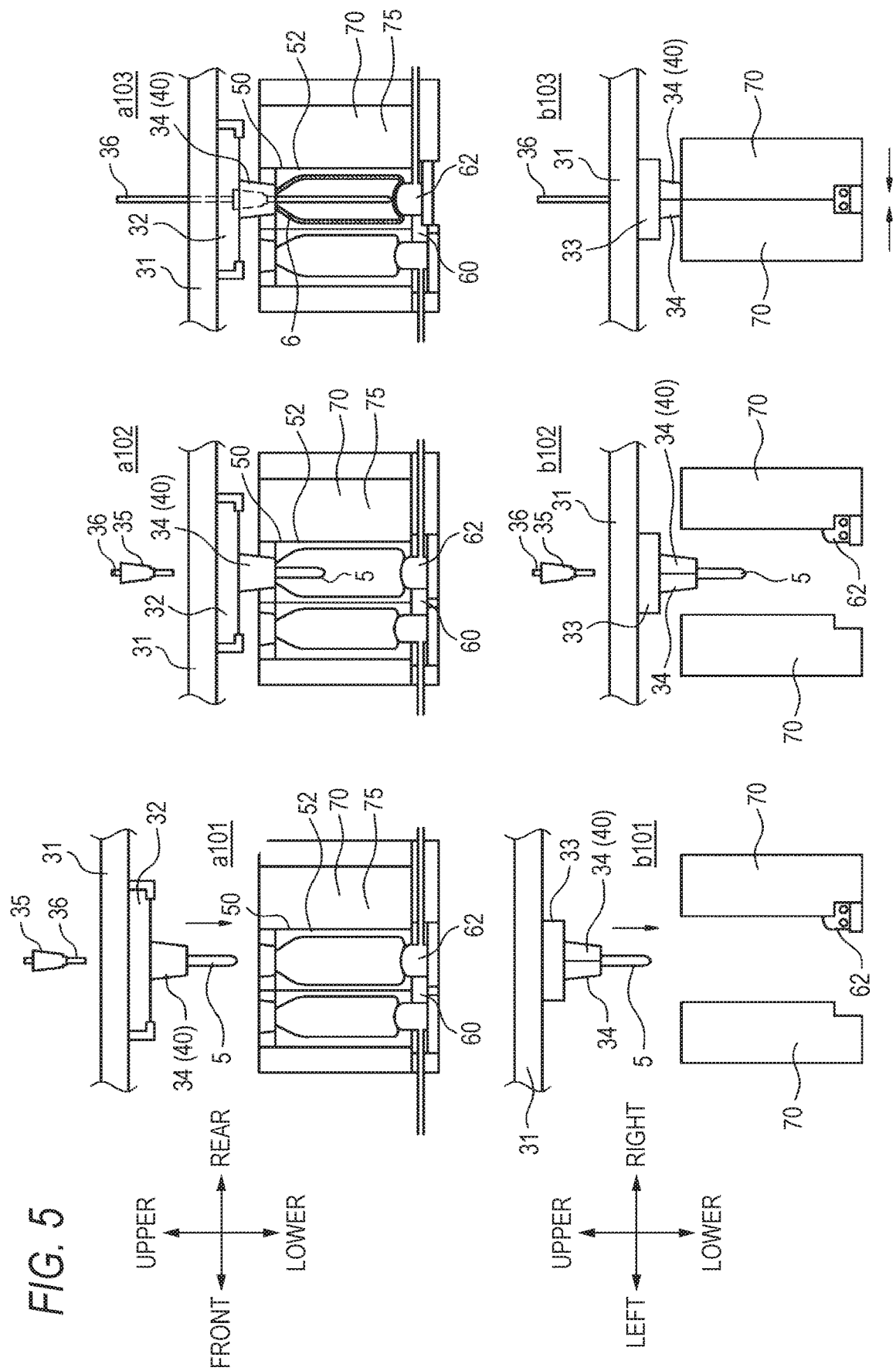
FIG. 5 depicts each step from a standby state to heat-set blowing in the blow molding method.

In the continuous blow molding unit 20, the mold unit 50 is opened and the cylinder rod of the moving unit 60 (not shown) is extended forward, so that the first mold part 52 of the mold unit 50 is located at a position at which the preform 5 is subjected to the heat-set blowing (refer to a101 and b101 of FIG. 5).

Subsequently, the support part 40 supporting the preform 5 is moved to dispose the temperature-adjusted preform 5 in the first space 53 of the first mold part 52 (step S103, refer to a102 and b102 of FIG. 5).

Subsequently, the mold unit 50 is mold-clamped and the bottom mold 62 is slightly moved up and is coupled to the first mold part 52 (refer to a103 and b103 of FIG. 5). By the heating device, the first inner wall surface 54 of the first mold part 52 is temperature-adjusted to the first temperature (for example, 170° C.) and the bottom mold 62 is temperature-adjusted to 100° C., for example. Then, the blow core mold 35 and the stretching rod 36 are moved down to introduce the blow air from the blow core mold 35 into the preform 5, and the stretching rod 36 is extended in conformity to a stroke of the first space 53, and the preform 5 in the first mold part 52 is subjected to the heat-set blow molding into the intermediate molded article 6 (step S104, refer to a103 of FIG. 5).

Figure 6:
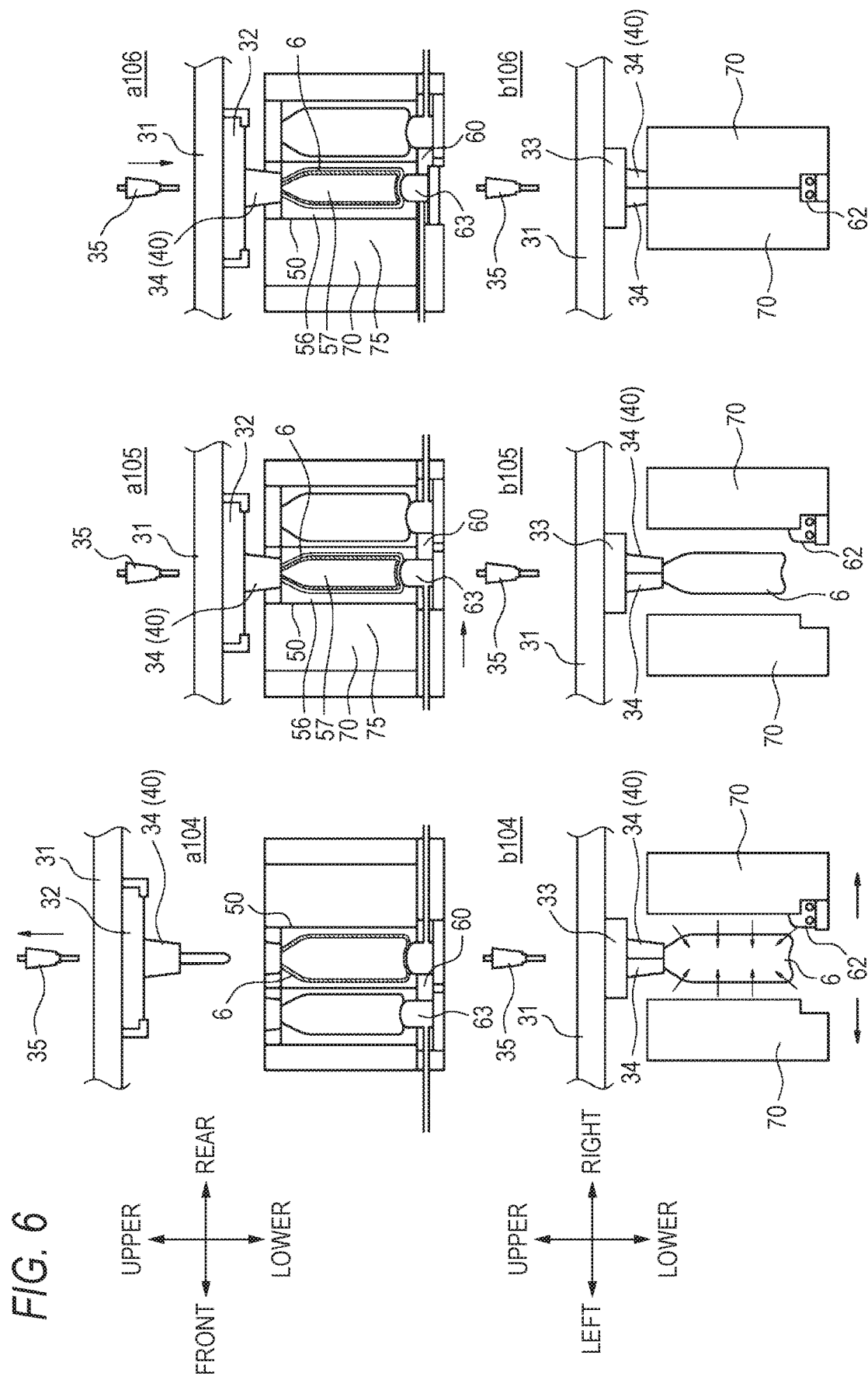
FIG. 6 depicts each step from mold opening after the heat-set blowing to mold clamping before final blowing in the blow molding method.

Subsequently, the mold unit 50 having been subjected to the heat-set blowing is mold-opened and the bottom mold 62 is slightly moved down (refer to a104 and b104 of FIG. 6). At the same time, the stretching rod 36 is moved up to separate from the intermediate molded article 6. The blow core mold 35 is also moved up, as necessary. The intermediate molded article 6 immediately after being subjected to the heat-set blowing in the first mold part 52 is larger than the second space 57 of the second mold part 56. The mold unit 50 is mold-opened, so that the intermediate molded article 6 demolded from the first mold part 52 shrinks and deforms to a size equivalent to or smaller than the second space 57 of the second mold part 56.

Subsequently, the cylinder rod of the moving unit 60 is contracted rearward to slide the mold unit 50 in the movement space 75 of the accommodation unit 70, so that the second mold part 56 of the mold unit 50 is located at a position at which the intermediate molded article 6 is to be subjected to the final blowing (step S106, refer to a105 and b105 of FIG. 6). In this case, the support part 40 is not moved, so that the position of the support part 40 at which the preform 5 has been supported (refer to a102 and b102 of FIG. 5) and the position of the support part 40 at which the intermediate molded article 6 is supported (refer to a105 and b105 of FIG. 6) are kept at the same position.

Subsequently, the mold unit 50 is mold-clamped, the bottom mold 63 is slightly moved up and coupled to the second mold part 56, and the intermediate molded article 6 is accommodated in the second space 57 of the second mold part 56 (refer to a106 and b106 of FIG. 6). By the temperature adjustment device, the second inner wall surface 58 of the second mold part 56 is temperature-adjusted to the second temperature (for example, 120° C.) and the bottom mold 63 is temperature-adjusted to 100° C., for example.

Figure 7:
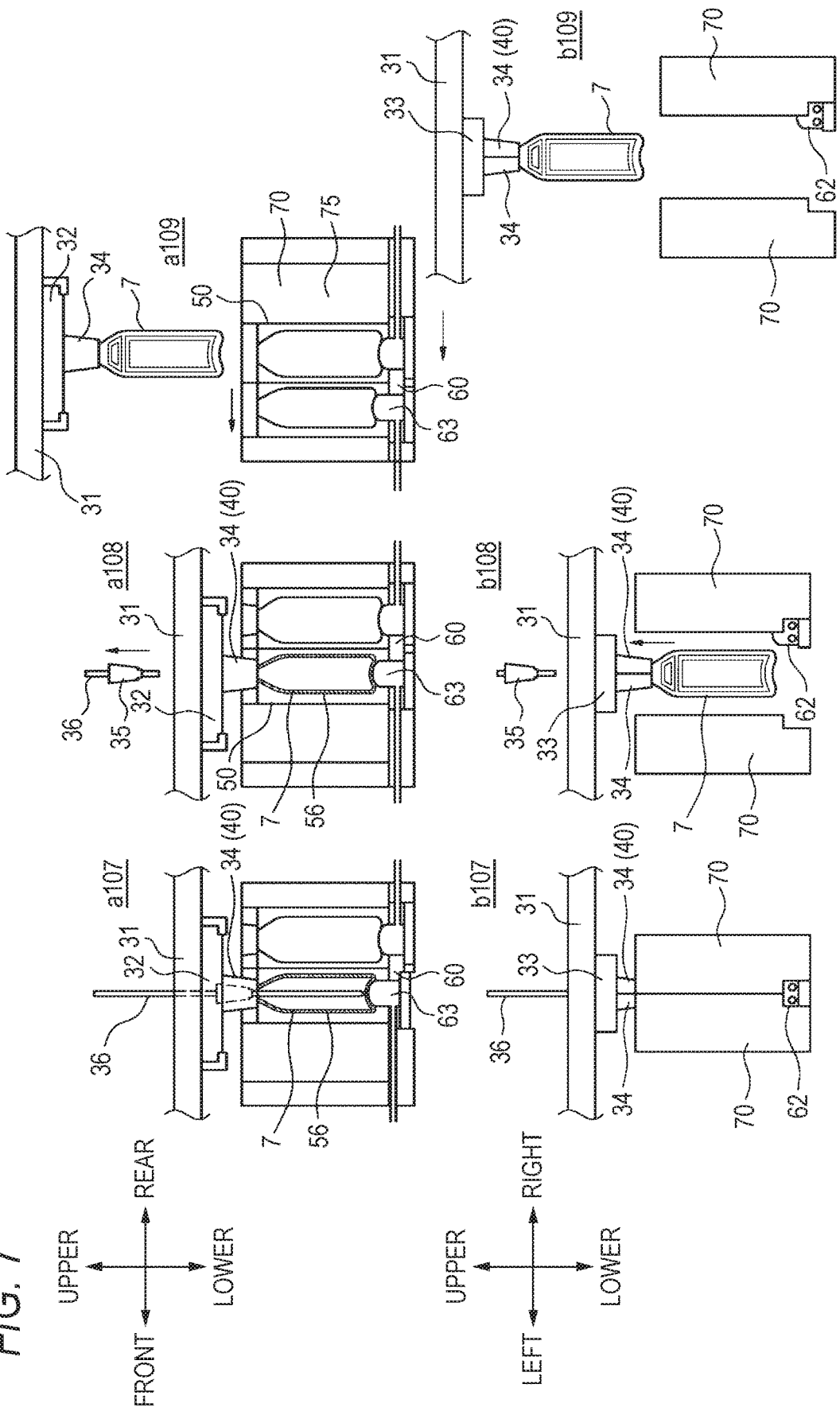
FIG. 7 depicts each step from final blowing to blow-molding completion in the blow molding method.

Subsequently, the stretching rod 36 is moved down (the blow core mold 35 is also moved down when the blow core mold 35 has been moved up after the heat-set blowing) to introduce the blow air from the blow core mold 35 into the intermediate molded article 6, the stretching rod 36 is extended in conformity to a stroke of the second space 57 and the intermediate molded article 6 is subjected to the final blow molding into the container 7 in the second mold part 56 (step S107, refer to a107 of FIG. 7).

Subsequently, the mold unit 50 performed the final blowing is mold-opened, the blow core mold 35 and the stretching rod 36 are moved up, and the bottom mold 63 is slightly moved down (refer to a108 and b108 of FIG. 7). The mold unit 50 is mold-opened, so that the container 7 is demolded from the second mold part 56. The support part 40 is moved up and the container 7 supported by the support part 40 is collected (step S108).

Subsequently, the cylinder rod of the moving unit 60 is extended forward, so that the mold unit 50 is slid in the movement space 75 of the accommodation unit 70 and returned to the initial state of the blow molding where the first mold part 52 of the mold unit 50 is located at the position at which the preform 5 is subjected to the heat-set blowing (step S109, refer to a109 and b109 of FIG. 7). The operations of coupling the first mold part 52 to the bottom mold 62 and coupling the second mold part 56 to the bottom mold 63 may be implemented after the introduction of the blow air by the blow core mold 35 and the extension of the stretching rod 36, in accordance with the molding conditions to be required.

Next, the mechanism moving up and down the bottom molds 62, 63 is described with reference to FIGS. 8 and 9.

Figure 8:
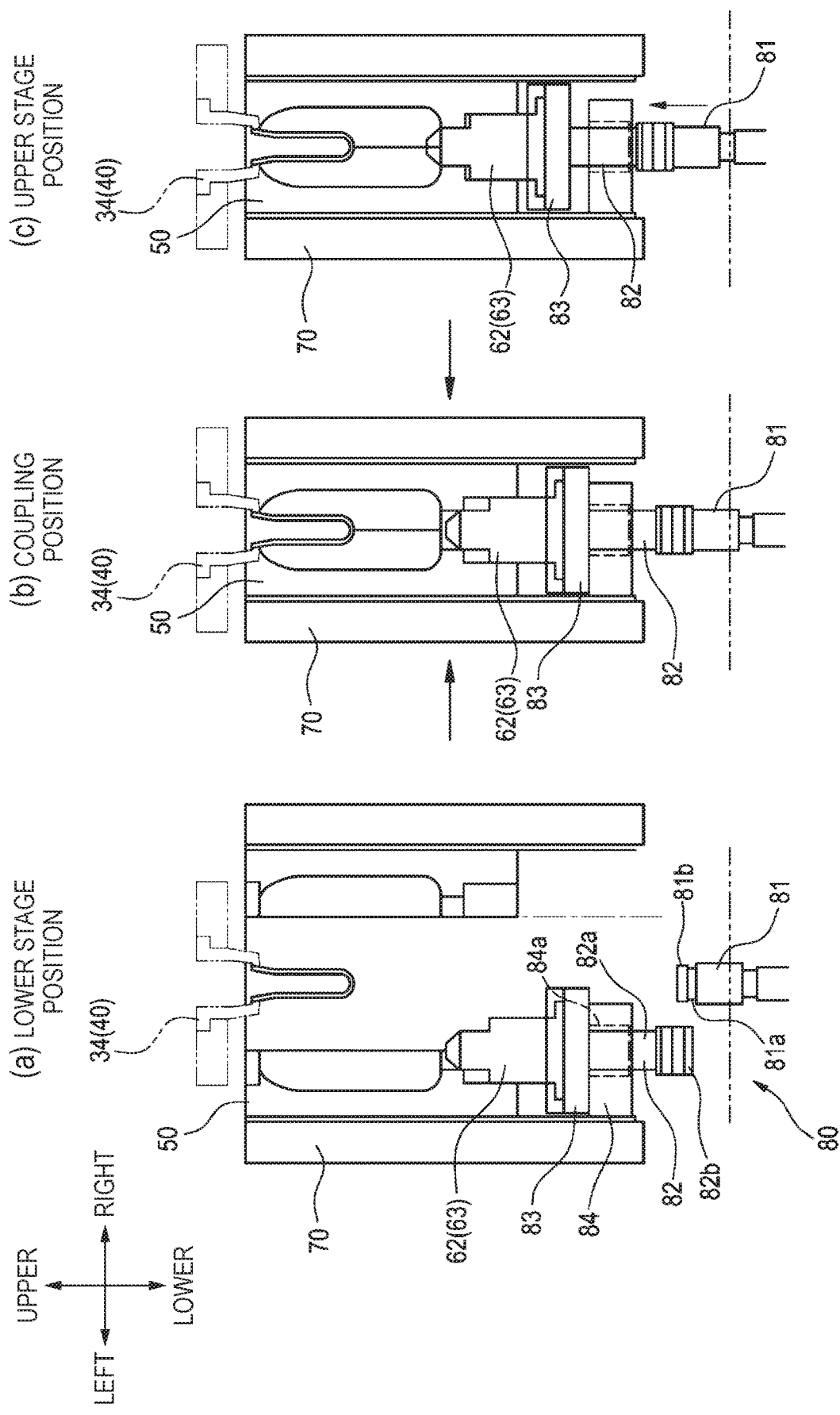
FIGS. 8(a) to 8(c) illustrate a mechanism moving up and down a bottom mold.
Figure 9:
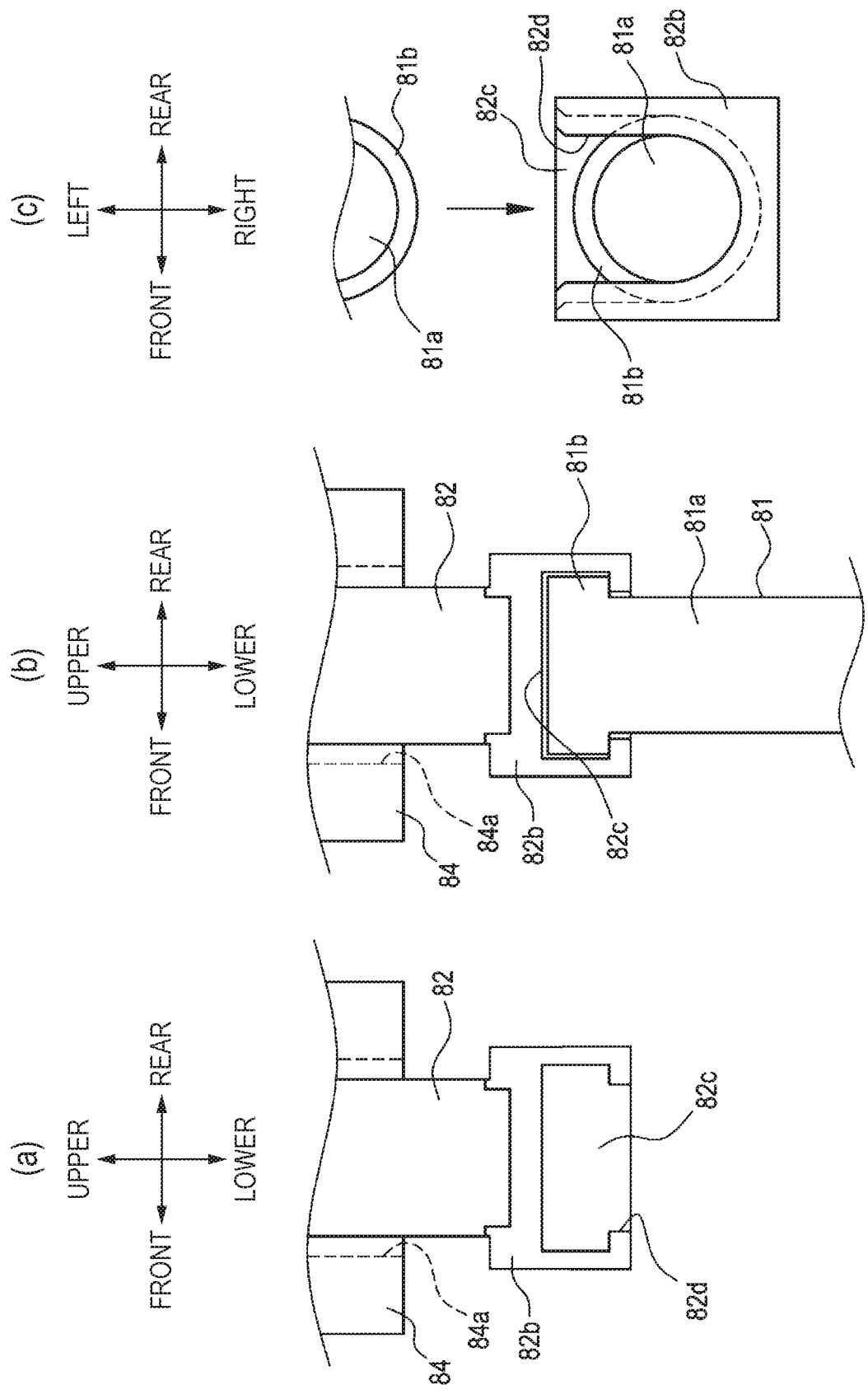
FIGS. 9(a) to 9(c) are enlarged views of coupled parts.
Figure 11:
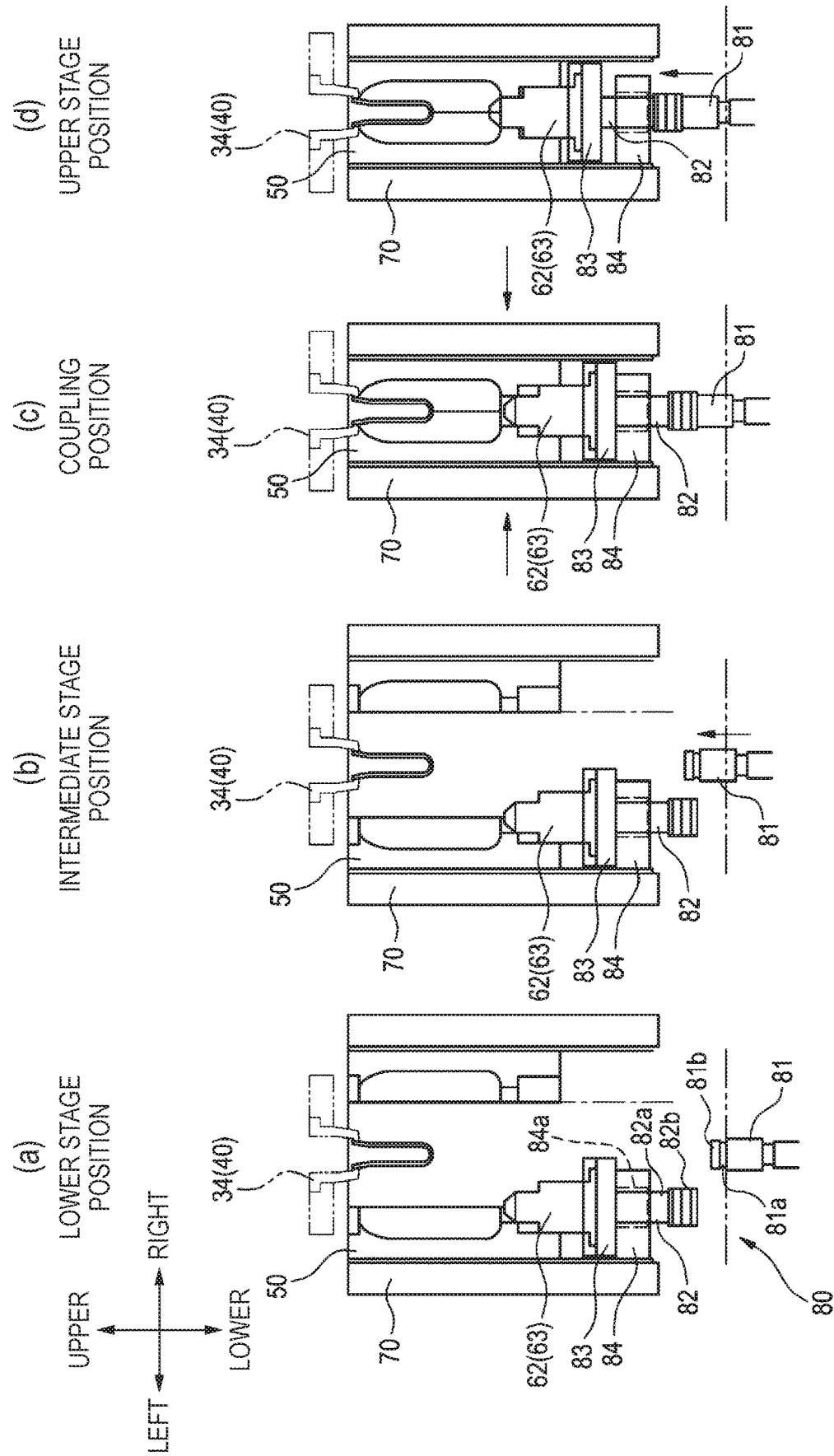
FIGS. 11(a) to 11(d) illustrate the mechanism moving up and down the bottom mold.

FIG. 8 illustrates the mechanism moving up and down the bottom molds 62, 63. As shown in FIG. 8, an elevation device 80 includes a coupling rod 81 and a coupled rod 82. The coupling rod 81 includes a shaft part 81a and a flange portion 81b provided at an upper end of the shaft part 81a, and a vertical section thereof is a substantial T-shape, and a horizontal section is a substantially circular shape. At least one coupling rod 81 is disposed along a mold closing line (parting line) of the mold unit 50, and is capable of moving up and down in the upper and lower direction with being fixed to a machine-side actuator (not shown).

The coupled rod 82 is vertically hung down, and includes a shaft part 82a and a coupled block 82b. An upper end of the shaft part 82a is fixed to a lower surface of a bottom mold fixing plate 83. The bottom mold 62 (or bottom mold 63) is fixed to an upper surface of the bottom mold fixing plate 83. Also, the bottom mold fixing plate 83 is placed to be vertically moveable on the upper surface of an elevation guide block 84 fixed to the moveable plate 66. The coupled block 82b is fixed to a lower end of the shaft part 82a and has a substantially rectangular parallelepiped outer appearance. One side surface of the coupled block 82b is provided with a recess 82c (refer to FIG. 9(a)) forming a space into which the coupling rod 81 can be slid (introduced) in the horizontal direction (a mold closing direction, a rightward or leftward direction in FIG. 9) in association with the mold closing operation of the mold unit 50. The recess 82c has a substantial T-shape, as seen from a side direction (a horizontal direction), and has an outer edge 82d having a substantial U-shape, as seen from below (a lower direction, in FIG. 9). The coupled rod 82 penetrates a guide hole 84a of the elevation guide block 84. The coupled rod 82, the bottom mold fixing plate 83 and the elevation guide block 84 are independently provided separately from the first mold 52 and the second mold 56, and can slide integrally with the molds. However, since they have substantially the same structure, they are here denoted with the same reference numerals.

As shown in FIGS. 10(a) and 10(b), in order to improve the general versatility and convenience relating to the mold opening/closing operation, the recess 82c may be formed to have a substantial T-shape penetrating the coupled block 82b from one side surface to an opposite side surface thereto so that the coupling rod 81 can be slid (introduced) from both side surfaces (both left and right directions in FIG. 10) of the coupled rod 82. In this case, the outer edge 82d of the recess 82c has a substantially linear shape extending in parallel with a side surface on which the recess 82c is not provided.

The elevation device 80 configured as described above moves up and down the bottom molds 62, 63 between two positions of upper and lower stages.

First, when the mold unit 50 is mold-opened, the coupling rod 81 is disposed at a standby position (lower stage position) shown in FIG. 8(a). At this time, the first mold 52 and the second mold 56 are slid. Then, when each split mold of the mold unit 50 is closed, the flange portion 81b of the coupling rod 81 is introduced and fitted into the recess 82c of the coupled rod 82 in the horizontal direction, so that the coupling rod 81 and the coupled rod 82 are coupled (coupling position, refer to FIGS. 8(b) and 9(b)). Thereafter, the coupling rod 81 is moved up by a drive force of the actuator, and the bottom mold fixing plate 83 having the coupled rod 82 fixed thereto and the bottom molds 62, 63 are moved to a position upon the blow molding (upper stage position) (refer to FIG. 8(c)). In this way, the bottom molds 62, 63 are moved from the standby position (lower stage position) to the position upon the blow molding (upper stage position). After the blow molding is over, the bottom molds 62, 63 are moved down to the lower stage position, and the mold unit 50 is mold-opened so as to release the coupling state between the coupling rod 81 and the coupled rod 82 and the mold unit 50 is again slid.

In the illustrative embodiment, since the mold unit 50 (the first mold part 52 and the second mold part 56) is configured to slide in the accommodation unit 70, the above two-stage movement is adopted. However, in the other configuration, there may be a member that may interfere with the coupling rod 81 in the apparatus. For example, there is a configuration where the moving unit 60 is not provided to the accommodation unit 70 and is mounted to a machine base (stationary part) of the blow molding apparatus 1 and the first mold part 52 and the second mold part 56 are not coupled to the mold clamping device all the time and are to be sequentially slid in thereto. In this case, as shown in FIGS. 11(a) to 11(d), a movement method that is performed among three positions of lower, intermediate and upper stages may be adopted. At the lower stage position shown in FIG. 11(a), the coupling rod 81 is located at a position at which it does not interfere with another member of the mold clamping device. Therefore, while the coupling rod 81 stands by at the lower stage position, the sliding of the mold unit 50 is performed. After the sliding is over, the coupling rod 81 is moved up to the intermediate stage position shown in FIG. 11(b). After the coupling rod 81 is moved to the intermediate stage position, the bottom molds 62, 63 can be moved up and down by a similar method to the example of FIG. 8 (when each split mold of the mold unit 50 is closed, the bottom molds are located at the coupling position shown in FIG. 11(c) and are moved up to the upper stage position shown in FIG. 11(d) upon the blow molding). After the blow molding is over, the bottom molds 62, 63 are once moved down to the intermediate stage position at the state where the mold unit 50 is closed and the mold unit is then opened, so that the coupling state between the coupling rod 81 and the coupled rod 82 is released. Then, the coupling rod is moved down to the lower stage position and the sliding of the mold unit 50 is then performed again.

Like this, even with the structure where the mold unit 50 slides, the bottom molds 62, 63 can be moved up and down in the vertical direction perpendicular to the sliding direction by the elevation device 80.

In the method referred to as 1-stage and 1-blow method in which the heat-set blowing and the final blowing are performed at the same time, it is not possible to set the blow mold to high temperatures, considering shrinkage and sticking to the mold after the blowing (for example, the blowing could be performed only at about 130° C.). As a result, a crystallization density of a PEF bottle manufactured by the 1-stage and 1-blow method is not very high, as compared to a PET bottle manufactured by the 2-stage and 2-blow method. Also, the strain (residual stress) of the PET bottle generated upon the blow molding is increased.

According to the apparatus of the 2-stage and 2-blow method, it is possible to manufacture a PET bottle having high heat resistance. However, since it is necessary to naturally cool the preform and then to heat to a temperature suitable for the blowing in the heating part, the energy efficiency is lowered. Also, according to the 2-stage and 2-blow method, the apparatus becomes enlarged and a wide equipment space is also required. For example, it is necessary to provide the two mold clamping mechanisms or blowing mechanisms.

In contrast, according to the mold unit 50, the blow molding apparatus 1, and the blow molding method of the illustrative embodiment, the 1-stage and 2-blow method, in which after injection-molding the preform 5, the heat-set blowing of the preform 5 and the final blowing of the intermediate molded article 6 are separately performed in succession, is adopted. For this reason, since the preform 5 manufactured in the injection molding unit 10 is subjected to the heat-set blowing without being cooled to the room temperature, the energy for reheating the preform 5 to the temperature suitable for blowing is not required, so that it is possible to improve the energy efficiency.

Also, according to the 1-stage and 2-blow method of the illustrative embodiment, it is possible to reduce a size of the blow molding apparatus 1 as compared to the 2-stage and 2-blow method so as to save the equipment cost of the blow molding apparatus 1 and reduce the equipment space. For example, it is possible to provide only one mold closing mechanism and it is also possible to establish the blow molding apparatus 1 just once. Also, it is possible to perform the injection molding, the heat-set blowing, and the final blowing in a short time and to repetitively perform the same.

Also, since the first mold part 52 and the second mold part 56 are separately defined in one mold unit 50, it is possible to perform the step of subjecting the preform 5 to the heat-set blowing in the first mold part 52, independently of the step of finally blowing the intermediate molded article 6 in the second mold part 56, which is to be subsequently performed in succession. For this reason, it is possible to set the first temperature, which is to be used in the heat-set blowing, to a temperature higher than the second temperature (for example, 120° C.), which is to be used in the final blowing, for example, to a temperature (for example, 170° C.) at which crystallization of resin is promoted, so that it is possible to manufacture the container 7 having sufficient heat resistance. Also, since the first mold part 52 and the second mold part 56 are disposed adjacently to each other in the mold unit 50, it is possible to perform the heat-set blowing and the final blowing in succession. Like this, since it is possible to separately perform the heat-set blowing and the final blowing in succession, it is not necessary to perform processing such as the temperature adjustment for the intermediate molded article 6 in order to avoid lowering the temperature of the intermediate molded article 6, so that it is possible to improve the energy efficiency. The "sufficient" heat resistance means heat resistance at which the shrinkage deformation is little caused even when liquid of high temperature of about 90° C. or higher is filled for sterilization.

In the preform 5 immediately after being manufactured by the injection molding unit 10, there may be a deviation in the temperature distribution on the preform 5 due to an influence of heat upon the injection. Regarding this, according to the above configuration, since the temperature adjustment processing is performed for the injection-molded preform and the heat-set blowing is performed for the preform 5 on which the deviation in the temperature distribution is small, it is possible to reduce the temperature deviation, which may be caused on the intermediate molded article 6 or the final container 7, so that the non-uniform thickness is difficult to be caused.

Also, since it is possible to slide the position of the mold unit 50 from the position, at which the heat-set blowing is performed, to the position, at which the intermediate molded article 6 is to be finally blown, via the moving unit 60, it is possible to further smoothly separately perform the heat-set blowing and the final blowing in succession.

Also, since the mold unit 50 to be slid is accommodated in the accommodation unit 70, the mold unit 50 can be protected from the outside and a defect due to positional deviation of the mold unit 50 in each step is difficult to be caused.

Also, since the accommodation unit 70 is provided with the positioning parts 73 for determining the position of the mold unit 50, the position of the mold unit 50 is determined with accuracy. For this reason, a defect due to positional deviation in each step is difficult to be caused.

Since the first space 53 of the first mold part 52 is formed larger than the second space 57 of the second mold part 56, it is possible to blow-mold the preform 5 largely during the heat-set blowing, considering shrinkage after the heat-set blowing.

Accordingly, according to the above configuration, it is possible to provide the mold unit 50, the blow molding apparatus 1, and the blow molding method capable of achieving improvements on both the energy efficiency and the heat resistance performance.

The present invention is not limited to the above illustrative embodiment and can be appropriately modified and improved. In addition, the materials, shapes, sizes, numerical values, forms, numbers, arrangement places and the like of the respective constitutional elements of the illustrative embodiment are arbitrary and are not particularly limited inasmuch as the present invention can be implemented.

For example, in the illustrative embodiment, the first mold part 52 and the second mold part 56 are respectively provided one by one. However, the present invention is not limited thereto.

Modified Embodiments

Modified embodiments of the continuous blow molding unit 20 are described with reference to FIGS. 12(*a*) to 12(*c*).

Figure 12:
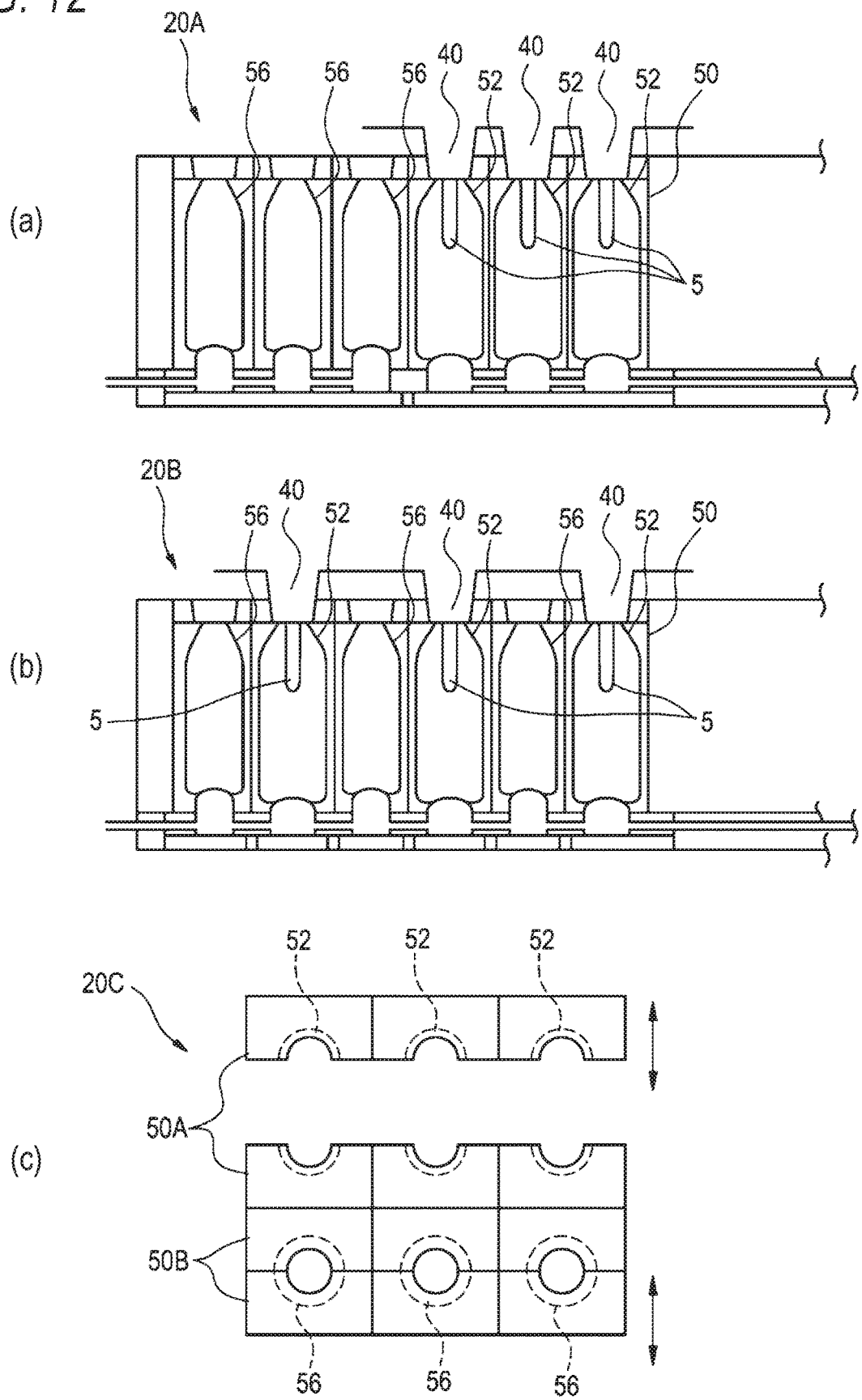
FIGS. 12(a) to 12(c) depict a modified embodiment of the continuous blow molding unit.

As shown in FIG. 12(*a*), in a continuous blow molding unit 20A of a modified embodiment, the mold unit 50 has a plurality of the first mold parts 52 and a plurality of the second mold parts 56 (three, in this example), respectively. Also, the three second mold parts 56 are disposed in succession adjacently to the three first mold parts 52 disposed in succession. Also, the three support parts 40 supporting the preforms 5 are provided in succession. In this case, in order to subject the preform 5 to the heat-set blowing in the first mold part 52 and then to finally blow the intermediate molded article 6 in the second mold part 56, the distance in which the mold unit 50 moves in the movement space 75 of the accommodation unit 70 is equivalent to the three mold parts in which the first mold part 52 and the second mold part 56 are provided in succession.

As shown in FIG. 12(*b*), in a continuous blow molding unit 20B in a modified embodiment, the three first mold parts 52 and the three second mold parts 56 of the mold unit 50 are configured to be disposed alternately one by one. Also, the three support pats 40 supporting the preforms 5 are alternately provided in conformity to the arrangement of the respective mold parts. In this case, in order to subject the preform 5 to the heat-set blowing and then to finally blow the intermediate molded article 6, the distance in which the mold unit 50 moves in the movement space 75 of the accommodation unit 70 is equivalent to one mold part, which is a pitch between the adjacent mold parts.

As shown in FIG. 12(*c*), in a continuous blow molding unit 20C in a modified embodiment, a mold unit 50A having three first mold parts 52 and a mold unit 50B having three second mold parts 56 are configured to be disposed in parallel. In this case, the mold units 50A and 50B are configured not to slide. When subjecting the preforms 5 to the heat-set blowing in the first mold parts 52, the mold unit 50A is mold-opened, as shown in FIG. 12(*c*), so that the three support parts 40 (not shown) are moved and the supported preforms 5 are disposed in the first spaces 53 of the first mold parts 52. Subsequently, when finally blowing the intermediate molded articles 6 in the second mold parts 56, the mold unit 50B is mold-opened, so that the support parts 40 are moved and the supported intermediate molded articles 6 are disposed in the second spaces 57 of the second mold parts 56.

According to the continuous blow molding units 20A to 20C in the modified embodiments, it is possible to provide the mold unit, the blow molding apparatus and the blow molding method capable of achieving improvements on both the energy efficiency and the heat resistance performance and blow-molding a plurality of containers at a time.

For example, in the illustrative embodiment, the present invention is applied to the mold unit, the blow molding apparatus and the blow molding method referred to as 1-stage method. However, the present invention is not limited thereto. For example, the present invention can also be applied to a 1.5-stage method. Also, the moving unit 60 sliding the mold unit 50 can be mounted to any one stationary part (for example, the machine base) of the blow molding apparatus 1, instead of the accommodation unit 70.

Although the present invention has been described in detail with reference to the specific illustrative embodiment, it is obvious to one skilled in the art that a variety of changes and modifications can be made without departing from the spirit and scope of the present invention.

The subject application is based on Japanese Patent Application No. 2015-213192 filed on Oct. 29, 2015, the contents of which are incorporated herein by reference.

DESCRIPTION OF REFERENCE NUMERALS

1: blow molding apparatus, 5: preform, 6: intermediate molded article, 7: container, 10: injection molding unit (injection molding part), 12: injection apparatus, 15: temperature adjustment unit (temperature adjustment part), 20: continuous blow molding unit (blow molding part), 25: removing unit (removing part) 25, 30: conveying means, 40: support part, 50: mold unit, 52: first mold part, 53: first space, 54: first inner wall surface, 56: second mold part, 57: second space, 58: second inner wall surface, 60: moving unit, 62, 63: bottom mold, 66: moveable plate, 70: accommodation unit, 72: sidewall part, 73: positioning part, 75: movement space

The invention claimed is:

1. A mold unit comprising:
   a first mold part for performing a first step of subjecting a preform to heat-set blowing at a first temperature;
   a second mold part for performing a second step of blow molding an intermediate molded article, which has been blow-molded by the heat-set blowing, at a second temperature lower than the first temperature, thereby manufacturing a container;
   a first bottom mold located at a lower end of the first mold part and configured to move up and down relative to the first mold part;
   a second bottom mold located at a lower end of the second mold part and configured to move up and down relative to the second mold part;
   an accommodation unit having a movement space in which the first mold part and the second mold part can integrally slide and accommodating the first mold part and the second mold part in the movement space during the first step and the second step;
   a movable plate arranged along a wall surface of the accommodation unit, the first mold part and the second mold part being attached to the movable plate;
   a first elevation guide block fixed to a lower end of the movable plate, the first bottom mold being mounted to the first elevation guide block such that the first bottom mold is configured to move up and down in a vertical direction;
   a second elevation guide block fixed to the lower end of the movable plate and independently provided separately from the first elevation guide block, the second bottom mold being mounted to the second elevation guide block such that the second bottom mold is configured to move up and down in the vertical direction independently of the first bottom mold;
   a first coupled rod fixed to a lower surface of the first bottom mold in a state where the first coupled rod is located inside a guide hole of the first elevation guide block; and
   a second coupled rod fixed to a lower surface of the second bottom mold and provided independently of the first coupled rod in a state where the second coupled rod is located inside a guide hole of the second elevation guide block,
   wherein the first coupled rod includes a first coupled block positioned on a bottom surface of the first coupled rod, the first coupled block having a recess in which a first coupling rod is configured to be inserted into to move the first bottom mold, and the recess has a substantial T-shape when viewed from a horizontal direction,
   wherein the second coupled rod includes a second coupled block positioned on a bottom surface of the second coupled rod, the second coupled block having a recess in which a second coupling rod is configured to be inserted into to move the second bottom mold, and the recess has a substantial T-shape when viewed from the horizontal direction,
   wherein a moving unit configured to move the mold unit is attached to a lateral surface of the mold unit,
   wherein the first mold part and the second mold part are disposed adjacently to each other, and
   wherein the first bottom mold and the second bottom mold are configured to move up and down independently of each other, the first bottom mold is configured to move up and down in the first step, and the second bottom mold is configured to move up and down in the second step.

2. The mold unit according to claim 1, wherein the first mold part and the second mold part are in contact with each other.

3. The mold unit according to claim 1, further comprising a movable plate arranged along a wall surface of the accommodation unit, the first mold part and the second mold part being attached to the movable plate,
   wherein the first bottom mold and the second bottom mold are attached to a lower end of the movable plate.

4. The mold unit according to claim 1,
   wherein the first mold part has a first inner wall surface that defines a first space
   in which the preform is to be disposed, and wherein the second mold part has a second inner wall surface that defines a second space in which the intermediate molded article is to be disposed.

5. The mold unit according to claim 4, wherein the first space is greater than the second space.

6. A blow molding apparatus comprising:
an injection molding unit manufacturing a bottomed preform made of resin; and
a continuous blow molding unit including the mold unit according to claim 1.

7. A blow molding method comprising:
injection molding a bottomed preform made of resin; and
in the mold unit according to claim 1, separately continuously performing:
subjecting the preform manufactured by the injection molding to heat-set blowing at a first temperature; and
blow molding an intermediate molded article, which has been blow-molded by the heat-set blowing, at a second temperature lower than the first temperature, thereby manufacturing a container.

8. A blow molding apparatus comprising:
an injection molding unit manufacturing a bottomed preform made of resin; and
a continuous blow molding unit including:
a mold unit including:
a first mold part for performing a first step of subjecting a preform manufactured by the injection molding unit to heat-set blowing at a first temperature, and
a second mold part for performing a second step of blow molding an intermediate molded article, which has been blow-molded by the heat-set blowing, at a second temperature lower than the first temperature, thereby manufacturing a container;
a support part supporting the preform during the first step and supporting the intermediate molded article during the second step;
a moving unit capable of relatively moving the support part and the mold unit,
a first bottom mold located at a lower end of the first mold part and configured to move up and down relative to the first mold part;
a second bottom mold located at a lower end of the second mold part and configured to move up and down relative to the second mold part;
an accommodation unit having a movement space in which the first mold part and the second mold part can integrally slide and accommodating the first mold part and the second mold part in the movement space during the first step and the second step;
a movable plate arranged along a wall surface of the accommodation unit, the first mold part and the second mold part being attached to the movable plate;
a first elevation guide block fixed to a lower end of the movable plate, the first bottom mold being mounted to the first elevation guide block such that the first bottom mold is configured to move up and down in a vertical direction;
a second elevation guide block fixed to the lower end of the movable plate and independently provided separately from the first elevation guide block, the second bottom mold being mounted to the second elevation guide block such that the second bottom mold is configured to move up and down in the vertical direction independently of the first bottom mold,
a first coupled rod fixed to a lower surface of the first bottom mold in a state where the-first coupled rod is located inside a guide hole of the first elevation guide block; and
a second coupled rod fixed to a lower surface of the second bottom mold and provided independently of the first coupled rod in a state where the second coupled rod is located inside a guide hole of the second elevation guide block,
wherein the first coupled rod includes a first coupled block positioned on a bottom surface of the first coupled rod, the first coupled block having a recess in which a first coupling rod is configured to be inserted into to move the first bottom mold, and the recess has a substantial T-shape when viewed from a horizontal direction,
wherein the second coupled rod includes a second coupled block positioned on a bottom surface of the second coupled rod, the second coupled block having a recess in which a second coupling rod is configured to be inserted into to move the second bottom mold, and the recess has a substantial T-shape when viewed from the horizontal direction,
wherein the support part is located above the mold unit,
wherein the moving unit is attached to a lateral surface of the mold unit,
wherein the first mold part and the second mold part are disposed adjacently to each other in the continuous blow molding unit, and
wherein the first bottom mold and the second bottom mold are configured to move up and down independently of each other, the first bottom mold is configured to move up and down in the first step, and the second bottom mold is configured to move up and down in the second step.

9. The blow molding apparatus according to claim 8, further comprising
a temperature adjustment unit that performs a temperature adjustment processing for making a temperature distribution of the preform manufactured by the injection molding unit become close to a uniform temperature distribution,
wherein the continuous blow molding unit performs the heat-set blowing for the preform that has been subjected to the temperature adjustment processing by the temperature adjustment unit.

10. The blow molding apparatus according to claim 8, wherein the continuous blow molding unit includes:
the mold unit having:
a first space in which the preform supported by the support part during the first step is to be disposed and which is configured by a first inner wall surface to be used in the heat-set blowing of the first step, and
a second space in which the intermediate molded article supported by the support part during the second step is to be disposed and which is configured by a second inner wall surface to be used in the blow molding of the second step,
wherein the first mold part has the first inner wall surface, and
wherein the second mold part has the second inner wall surface.

11. The blow molding apparatus according to claim 10, wherein the first space is greater than the second space.

12. The blow molding apparatus according to claim 10, wherein a position at which the support part supports the preform during the first step and a position at which the support part supports the intermediate molded article during the second step are the same, and wherein the moving unit slides the mold unit so that the intermediate molded article is to be disposed in the second space after the first step.

13. The blow molding apparatus according to claim 10, further comprising an accommodation unit having a movement space in which the mold unit is capable of being slid by the moving unit, and accommodating the mold unit in the movement space during the first step and the second step.

14. The blow molding apparatus according to claim 13, wherein the accommodation unit includes a positioning part that determines a position of the mold unit during the first step and the second step.

15. A blow molding method comprising:
injection molding a bottomed preform made of resin; and
separately continuously performing:
  subjecting the preform manufactured by the injection molding to heat-set blowing in a first mold part adjusted at a first temperature; and
  blow molding an intermediate molded article, which has been blow-molded by the heat-set blowing, in a second mold part adjusted at a second temperature lower than the first temperature, thereby manufacturing a container,
wherein a first bottom mold and a second bottom mold are located at a lower end of a mold unit including the first mold part and the second mold part, the first bottom mold being configured to move up and down relative to the first mold part, the second bottom mold being configured to move up and down relative to the second mold part,
wherein a support part supporting the preform during subjecting the preform and supporting the intermediate molded article during blow molding the intermediate molded article is located above the mold unit,
wherein a moving unit capable of relatively moving the support part and the mold unit is attached to a lateral surface of the mold unit,
wherein the first bottom mold and the second bottom mold are configured to move up and down independently of each other, the first bottom mold is configured to move up and down in the first step, and the second bottom mold is configured to move up and down in the second step,
wherein the mold unit further comprises an accommodation unit having a movement space in which the first mold part and the second mold part can integrally slide and accommodating the first mold part and the second mold part in the movement space during the first step and the second step;
wherein a movable plate is arranged along a wall surface of the accommodation unit, the first mold part and the second mold part being attached to the movable plate;
wherein a first elevation guide block is fixed to a lower end of the movable plate, the first bottom mold being mounted to the first elevation guide block such that the first bottom mold is configured to move up and down in a vertical direction;
wherein a second elevation guide block is fixed to the lower end of the movable plate and independently provided separately from the first elevation guide block, the second bottom mold being mounted to the second elevation guide block such that the second bottom mold is configured to move up and down in the vertical direction independently of the first bottom mold;
wherein a first coupled rod is fixed to a lower surface of the first bottom mold in a state where the first coupled rod is located inside a guide hole of the first elevation guide block;
wherein a second coupled rod is fixed to a lower surface of the second bottom mold and provided independently of the first coupled rod in a state where the second coupled rod is located inside a guide hole of the second elevation guide block;
wherein the first coupled rod includes a first coupled block positioned on a bottom surface of the first coupled rod, the first coupled block having a recess in which a first coupling rod is configured to be inserted into to move the first bottom mold, and the recess has a substantial T-shape when viewed from a horizontal direction; and
wherein the second coupled rod includes a second coupled block positioned on a bottom surface of the second coupled rod, the second coupled block having a recess in which a second coupling rod is configured to be inserted into to move the second bottom mold, and the recess has a substantial T-shape when viewed from the horizontal direction.

16. The blow molding method according to claim 15, further comprising:
temperature adjusting the preform manufactured by the injection molding so as to make a temperature distribution of the preform manufactured by the injection molding become close to a uniform temperature distribution after the injection molding, wherein the heat-set blowing is performed for the preform that has been subjected to the temperature adjusting.

* * * * *